United States Patent [19]
Girondi

[11] Patent Number: 5,904,845
[45] Date of Patent: May 18, 1999

[54] FUEL FILTER, IN PARTICULAR FOR DIESEL FUEL

[75] Inventor: Giorgio Girondi, Monte Carlo, Italy

[73] Assignee: UFI Universal Filter International Spa, Verona, Italy

[21] Appl. No.: 08/892,095

[22] Filed: Jul. 14, 1997

[30] Foreign Application Priority Data

Jul. 25, 1996 [IT] Italy .................................. RE96A0056

[51] Int. Cl.[6] .................................................. B01D 27/14
[52] U.S. Cl. ........................ 210/306; 210/315; 210/489; 210/493.2; 210/507
[58] Field of Search .................................... 210/306, 315, 210/456, 499, 506, 507, DIG. 5, 342, 484, 485, 489–491, 493.1, 493.2, 493.5, 338

[56] References Cited

U.S. PATENT DOCUMENTS

| | | | |
|---|---|---|---|
| 3,216,578 | 11/1965 | Wright et al. | 210/484 |
| 4,046,697 | 9/1977 | Briggs et al. | 210/490 |
| 4,624,779 | 11/1986 | Hurner | 210/306 |
| 4,780,203 | 10/1988 | Barcy | 210/DIG. 5 |

FOREIGN PATENT DOCUMENTS

| | | |
|---|---|---|
| 0 203703 | 12/1986 | European Pat. Off. . |
| 0 260069 | 3/1988 | European Pat. Off. . |
| 0 412210 | 2/1991 | European Pat. Off. . |
| 713814 | 8/1954 | United Kingdom ................... 210/315 |
| 2020564 | 11/1979 | United Kingdom ............. 210/DIG. 5 |
| 2 138693 | 10/1984 | United Kingdom . |

*Primary Examiner*—Matthew O. Savage
*Attorney, Agent, or Firm*—Birch, Stewart, Kolasch & Birch, LLP

[57] ABSTRACT

A fuel filter comprising a container, a filter cartridge coaxially disposed within said container and defining therebetween a first chamber having an upper portion disposed above the filter cartridge, a lower portion surrounding the lateral surface of the filter cartridge, a second chamber disposed within the filter cartridge and a third chamber disposed below the filter cartridge, an inclined surface disposed in the upper portion of the first chamber, fuel inlet means for introducing fuel to the upper portion of the first chamber, said fuel descending along said inclined surface for initial separation of water from the fuel before passing to the lower portion of the first chamber and through the lateral surface of said filter cartridge into said second chamber, outlet means communicating with the second chamber within the filter cartridge, means for closing the ends of the cartridge so that the only passageway between the first chamber and the second chamber is through the lateral surface of the filter cartridge, and a mesh surface provided to cover and adhere to the lateral surface of the filter cartridge.

7 Claims, 2 Drawing Sheets

FUEL FILTER, IN PARTICULAR FOR DIESEL FUEL

BACKGROUND OF THE INVENTION

The present invention relates to the filtration of fuel, in particular fuel (generally known as gasoil) for diesel engines.

In this sector the sophistication of injection equipment requires the most careful filtration to prevent the impurities present in the fuel from causing damage to and malfunction of the delicate injection equipment.

A technical problem which has not been totally solved is caused by the presence of water parts in the fuel, which are not removed by the usual filter cartridges (designed to intercept more solid parts) and hence reach the downstream mechanical members, resulting in oxidation problems and breakage thereof.

To solve this problem, and upstream of the cartridge, there is inserted an inclined surface, generally having a frusto-conical shape, along which the entering fuel flow runs before reaching the filter cartridge.

Because the water has a greater specific gravity than the fuel, it tends to move more towards the inclined surface, where its travel is decelerated, with the result that the water particles tend to units to form relatively large water droplets, which then fall to the base of the filter, where they collect without passing through the filter cartridge.

This solution is not however totally satisfactory, in that generally at least a fraction of the water is not separated and reaches the outlet to cause the described problems.

SUMMARY OF THE INVENTION

Therefore, an object of the present invention is to provide a filter which is able to more effectively separate the water present in fuel, in particular in diesel fuel, and quite possibly achieve complete separation.

The present invention is based on the idea of adding to the usual filter cartridge disposed within a known type of filter, a mesh surface through which the entire flow of fuel passes. This mesh surface is coated with a substance such as polytetrafluoroethylene (PTFE) or silicone or a similar equivalent substances which has passage pores of a diameter not greater than about 200 microns, which has proven to be effective in preventing passage of the water parts present in the fuel. The mesh surface is preferably positioned (but not necessarily) downstream of an inclined surface for water pre-separation.

BRIEF DESCRIPTION OF THE DRAWINGS

The present invention will be described in greater detail hereinafter with taps aid or the accompanying figures, wherein.

DETAILED DESCRIPTION OF THE INVENTION

Figure 1:
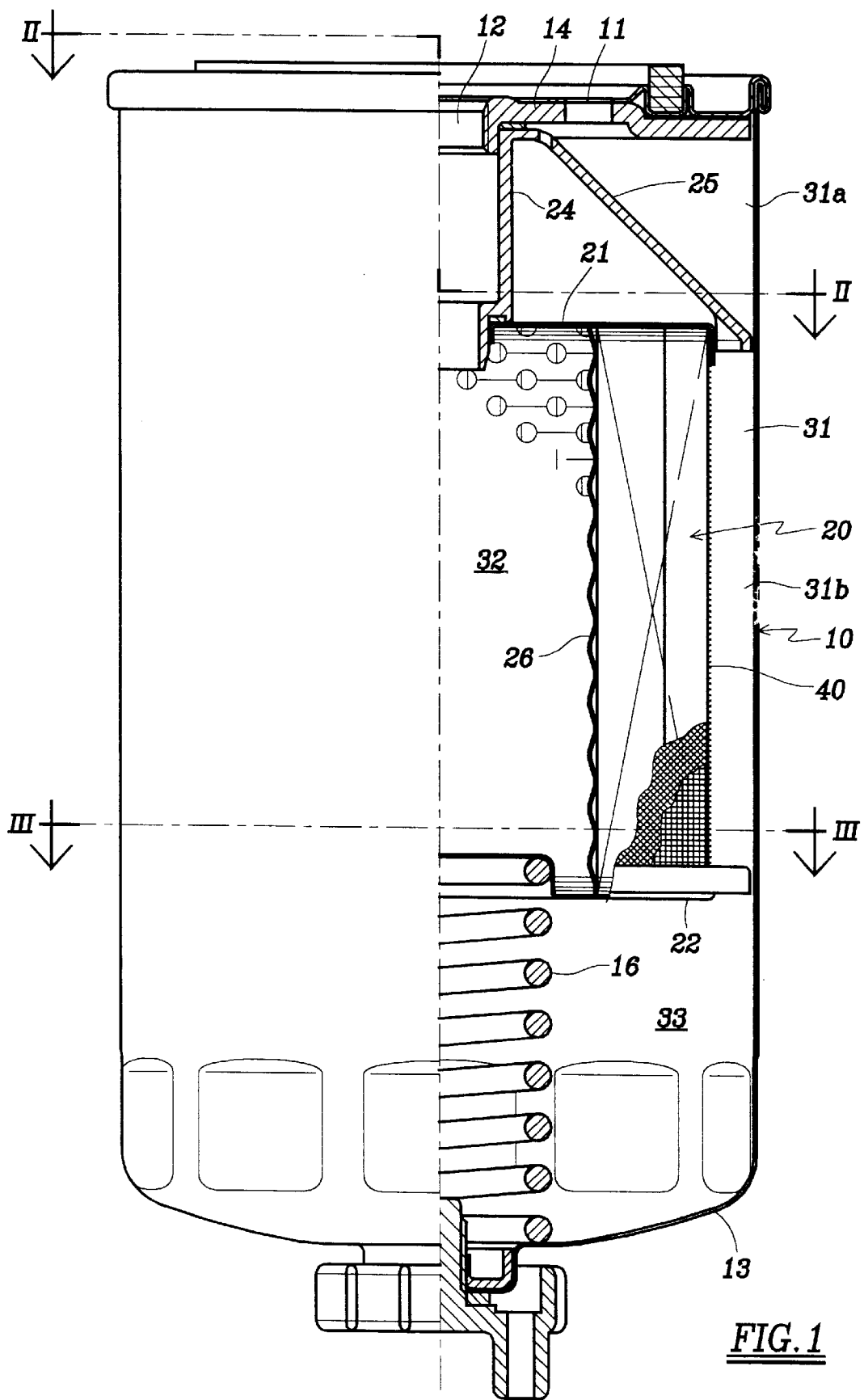
FIG. 1 is a vertical elevation of a filter shown partially in section on an axial plane.
Figure 2:
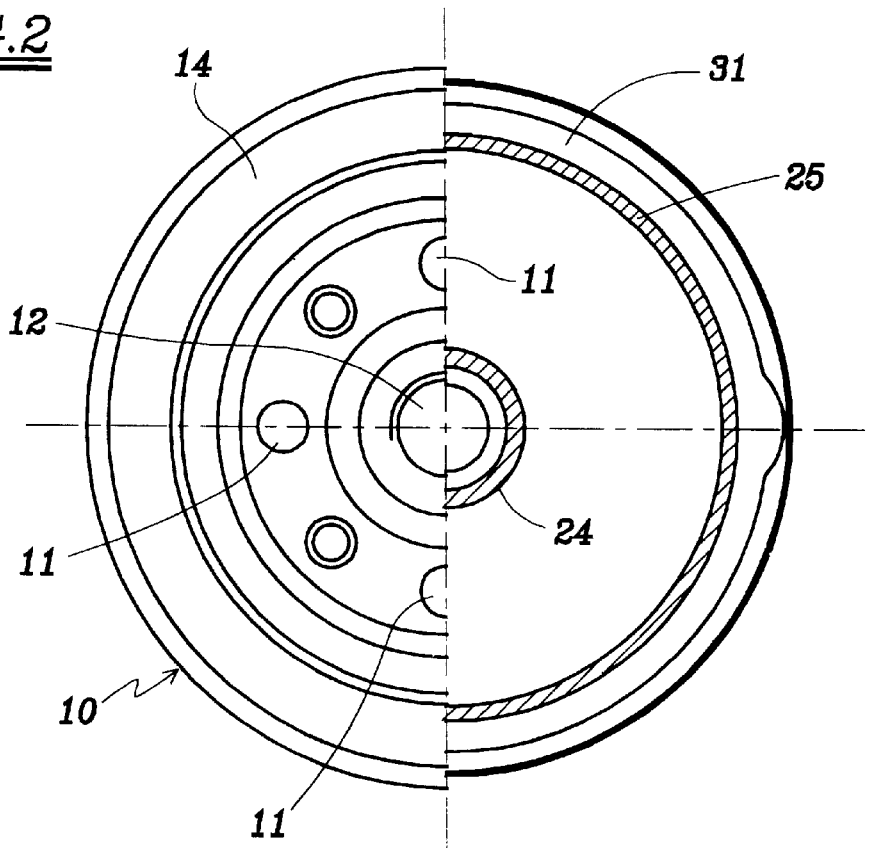
FIG. 2 is a section taken along line I—I: of FIG. 1.
Figure 3:
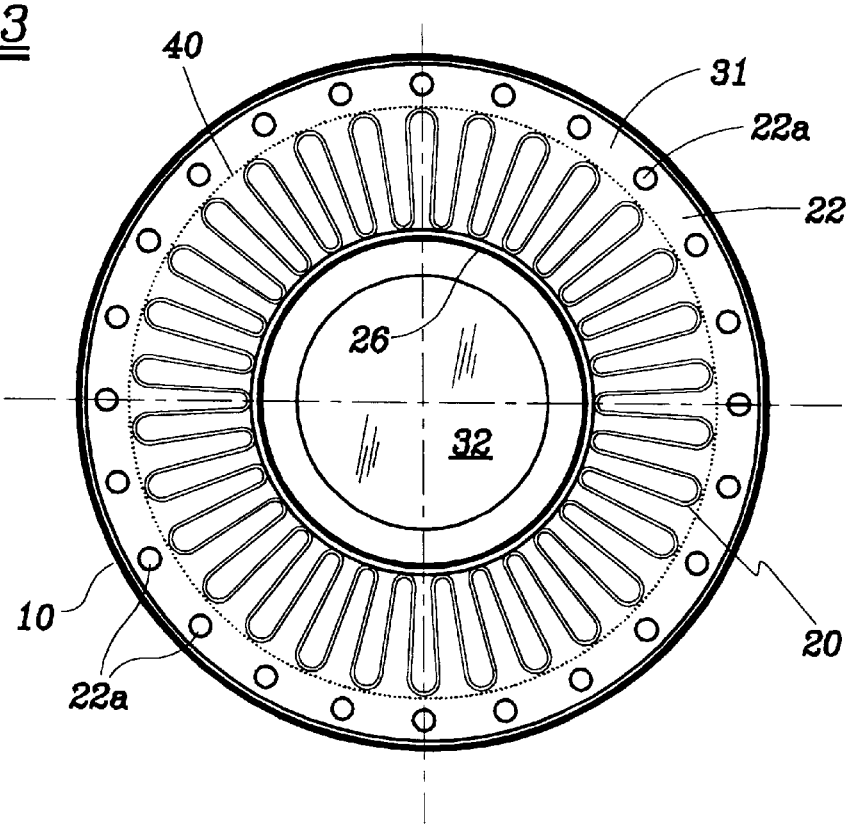
FIG. 3 is a section taken along line II—II of FIG. 1.

The filter comprises an outer container 10 having a vertical axis A and having a substantially cylindrical shape with slight lower end dishing.

The fuel inlet and outlet are located on the upper cover 14 of the container 10. Specifically, the inlet is defined by various apertures 11, regularly distributed along the circumference of the container with its center on the axis A. The outlet 12 is a single aperture with its center on the axis A.

Within the container 10 there is a filter cartridge 20 of known type, the cross-section of which is in the form of a circular crown. The filter cartridge is disposed substantially coaxial with the container 10. The cartridge 20 defines the filter medium for filtering off the impurities present in the fuel.

The outer diameter and height of the cartridge 20 are less than the corresponding dimensions of the container 10. Consequently the outer cylindrical surface of the cartridge 20 is spaced from the inner surface of the outer container 10, and its lower surface is spaced from the base 13 of the container 10.

The region above and external to the lateral surfaces of the cartridge, defines a first chamber 31 which communicates with the fuel inlet ports 11.

The region internal to the cartridge 20 defines a second chamber 32, which is separated from the chamber 31 by the cartridge itself.

The region below the cartridge 20 defines a third chamber 33 which communicates with the first chamber 31.

The upper end of the cartridge 20 and its lower end are closed respectively by an upper disc 21 and a lower disc 22 which are joined to the respective ends. To the inner lateral surface of the cartridge 20 there is fixed a perforated support tube 26, the ends of which are fixed to the upper disc 21 and lower disc 22 respectively.

Between the upper disc 21 and the cover 14 there is positioned a conduit 24, which is joined to these elements and connects the inner chamber 32 to the outlet aperture 12. A spring 16 is interposed between the base 13 and the lower disc 22 to maintain the cartridge (with relative discs 21 and 22) biased against the conduit 24, which in turn is urged against the cover 14.

Passage between the first chamber 31 and the second chamber 32 takes place only through the lateral surface of the cartridge 20, in a substantially radial direction.

The lower disc 22 has apertures 22a in its periphery to provide free passage between the first chamber 31 and the third chamber 33.

The chamber 31 is divided into an upper portion 31a positioned above the cartridge 20, and a lower portion 31b freely communicating with the portion 31a and positioned to surround the lateral surface of the cartridge 20.

The upper portion 31a directly communicates with the inlet apertures 11. Within it there is provided a frusto-conical element 25 fixed to the conduit 24 and extending below the apertures 11, as well as being inclined in the outward and downward direction. The element 25 defines an inclined surface along which the flow descends before passing through the cartridge 20 and serves to provide an initial separation of the water portion of the fuel.

According to the present invention, there is provided a mesh surface 40 which separates the first chamber 31 from the second chamber 32 and is coated with a substance such as polytetrafluoroethylene (PTFE—usually known as teflon$^R$) or silicone or the like and has passage pores of a diameter not exceeding about 200 microns for filtering out the water parts present in the fuel.

According to a preferred embodiment of the present invention, the mesh surface 40 is positioned coaxial to the cartridge 20, and in particular contact and covers the lateral surface of the cartridge 20, the entire flow which passes from the first chamber 31 to the second chamber 32 as it traverses the cartridge 20.

According to a preferred embodiment of the present invention, the mesh surface 40 is formed from a single-thread fabric, the thread diameter of which varies from 0.02 to 0.2 mm.

Preferably, the mesh surface is of stainless steel, or nylon, or polyamide. Preferably the coating thickness is 2–8 microns.

In practice the PTFE is applied to both sides of the surface 40, or to one side only, by spraying, followed by baking in an oven. Alternatively silicone can be applied to one or both sides of the surface 40.

In operation, the fuel first enters the upper portion 31a of the first chamber 31 via the aperture 11, and then runs along the surface of the frusto-conical element 25 to pass into the lower portion 31b.

The element 25 decelerates the travel of the water particles and tends to cause them to aggregate into relatively large droplets which then tend to fall directly into the third chamber 33, the purpose of which is to collect these water parts separated from the fuel.

The water parts which are not separated by the inclined surface are, in any event, removed by the mesh surface 40 according to the present invention.

In this respect it has been experimentally found that the surface 40, having the aforesaid technical characteristics, substantially completely prevents or at least strongly limits water passage therethrough, while at the same time providing no obstacle to the passage of the actual fuel.

Presumably this favorable phenomenon is caused by a different surface tension of the water particles which, in the presence of the teflon or silicon-coated mesh 40, break the bonds with the fuel molecules and then mutually agglomerate and as such are unable to pass through the mesh, the water particles then fall downward into the collection chamber 33, from where they are periodically extracted.

Evidently the smaller the pore diameter of the surface 40, the greater is the interception action of the water particles. In practice, at a diameter of 20 microns, there is a total separation of the water particles from the fuel.

Numerous modifications can be made to that part of the filter excluding the mesh surface 40.

Numerous modifications of a practical and applicational nature can be made to the surface 40, without departing from the spirit and scope of the present invention.

I claim:

1. A fuel filter comprising:

a container, a filter cartridge coaxially disposed within said container and defining therebetween a first chamber having an upper portion disposed above the filter cartridge, a lower portion surrounding a lateral surface of the filter cartridge, a second chamber disposed within the filter cartridge and a third chamber disposed below the filter cartridge, an element having an inclined surface disposed in the upper portion of the first chamber, fuel inlet means for introducing fuel to the upper portion of the first chamber, said fuel descending along said inclined surface for initial separation of water from the fuel before passing to the lower portion of the first chamber and through the lateral surface of said filter cartridge into said second chamber, outlet means communicating with the second chamber within the filter cartridge, means for closing the ends of the cartridge so that the only passageway between the first chamber and the second chamber is through the lateral surface of the filter cartridge, a mesh surface provided in contact with and covering the lateral surface of the filter cartridge for filtering out water from the fuel, said mesh surface is coated with a material selected from the group consisting of polytetrafluoroethylene and silicone, said mesh surface having pores with a diameter of not greater than about 200 microns for intercepting water particles present in the fuel, and the filter cartridge includes a pleated filter media having radially outer portions in abutting contact with the mesh surface, said mesh surface radially surrounding an outer peripheral surface of the pleated filter media.

2. The fuel filter of claim 1, wherein the mesh surface is formed from single-thread fabric, the thread diameter of which varies from 0.02 to 0.2 mm.

3. The fuel filter of claim 1, wherein the mesh surface is made of stainless steel.

4. The fuel filter of claim 1, wherein the mesh surface is made of nylon.

5. The fuel filter of claim 1, wherein the mesh surface is a polyamide.

6. The fuel filter of claim 1, wherein the coating material has a thickness of 2–8 microns.

7. The fuel filter of claim 1, wherein the element having the inclined surface has a frusto-conical configuration.

* * * * *